United States Patent
Yadav et al.

(10) Patent No.: US 12,363,022 B2
(45) Date of Patent: Jul. 15, 2025

(54) ZERO TOUCH CONFIGURATION FOR A MESH OF NODES USING SEGMENT ROUTING FLEXIBLE ALGORITHM

(71) Applicant: Ciena Corporation, Hanover, MD (US)

(72) Inventors: Bhupendra Yadav, Ottawa (CA);
Prabhu Vaithilingam, Kanata (CA);
Gerald Smallegange, Stittsville (CA);
Alwyn Joy George, Harinagar (IN)

(73) Assignee: Ciena Corporation, Hanover, MD (US)

( * ) Notice: Subject to any disclaimer, the term of this patent is extended or adjusted under 35 U.S.C. 154(b) by 34 days.

(21) Appl. No.: 18/456,731

(22) Filed: Aug. 28, 2023

(65) Prior Publication Data
US 2025/0023809 A1    Jan. 16, 2025

(30) Foreign Application Priority Data
Jul. 13, 2023    (IN) .............................. 202311047228

(51) Int. Cl.
| | |
|---|---|
| *H04L 45/02* | (2022.01) |
| *H04L 12/46* | (2006.01) |
| *H04L 45/12* | (2022.01) |

(52) U.S. Cl.
CPC .......... *H04L 45/02* (2013.01); *H04L 12/4633* (2013.01); *H04L 45/12* (2013.01)

(58) Field of Classification Search
CPC ...... H04L 45/02; H04L 12/4633; H04L 45/12
See application file for complete search history.

(56) References Cited

U.S. PATENT DOCUMENTS

| | | | |
|---|---|---|---|
| 7,609,620 B2 | 10/2009 | Raj et al. | |
| 7,751,405 B1 * | 7/2010 | Kompella | ............... H04L 47/70 370/254 |
| 7,969,898 B1 | 6/2011 | Raj et al. | |
| 8,116,308 B2 | 2/2012 | Ellis et al. | |
| 8,504,727 B2 | 8/2013 | Mohan et al. | |
| 8,576,708 B2 | 11/2013 | Gandhi et al. | |
| 8,982,908 B1 * | 3/2015 | Shukla | .................... H04L 45/16 370/473 |
| 9,049,142 B1 | 6/2015 | Osborne et al. | |

(Continued)

FOREIGN PATENT DOCUMENTS

EP    2028795 A1 *    2/2009    ............ H04W 80/02

OTHER PUBLICATIONS

Nov. 22, 2024, European Search Report issued for European Patent Application No. EP 24 18 8115.

*Primary Examiner* — Chris Parry
*Assistant Examiner* — Dixon F Dabipi
(74) *Attorney, Agent, or Firm* — Baratta Law PLLC; Lawrence A. Baratta, Jr.

(57) ABSTRACT

Systems and methods for zero touch configuration for a mesh of nodes using Segment Routing Flexible Algorithm define a Flex Algo Definition (FAD) of an auto-mesh plane. A method, in one embodiment, includes, responsive to the FAD, providing an advertisement of a Prefix Segment Identifier (SID) for a node in the auto-mesh plane; and including a flag in the advertisement designating whether the node is a destination node or a non-destination node in the auto-mesh plane. The destination node is one which requires transport connectivity to all other destination nodes in the auto-mesh plane, and the non-destination node is one used for reachability to all the destination nodes.

15 Claims, 9 Drawing Sheets

(56) References Cited

U.S. PATENT DOCUMENTS

| | | | |
|---|---|---|---|
| 9,197,493 B2 | 11/2015 | Holness et al. | |
| 9,538,573 B2 | 1/2017 | Khan et al. | |
| 10,158,448 B2 | 12/2018 | Prakash et al. | |
| 10,237,317 B2 | 3/2019 | Celinski et al. | |
| 10,637,768 B1* | 4/2020 | Joseph | H04L 45/02 |
| 11,271,854 B2* | 3/2022 | Yadav | H04L 45/64 |
| 11,388,088 B2 | 7/2022 | Filsfils et al. | |
| 2006/0250964 A1* | 11/2006 | Vasseur | H04L 45/50 370/238 |
| 2010/0110928 A1* | 5/2010 | Elias | H04L 45/32 370/254 |
| 2010/0115272 A1* | 5/2010 | Batta | H04L 45/566 713/162 |
| 2013/0100941 A1* | 4/2013 | Lampin | H04W 72/0446 370/336 |
| 2020/0076727 A1* | 3/2020 | Filsfils | H04L 45/34 |
| 2020/0344151 A1* | 10/2020 | Joseph | H04L 45/03 |
| 2021/0258249 A1* | 8/2021 | Torvi | H04L 45/04 |
| 2021/0352011 A1* | 11/2021 | Boutros | G06F 13/4022 |
| 2022/0124019 A1* | 4/2022 | Boutros | H04L 45/033 |
| 2022/0182317 A1* | 6/2022 | Thoria | H04L 12/4633 |
| 2022/0247663 A1* | 8/2022 | Van de Velde | H04L 45/302 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|Flex-Algorithm |  Metric-Type  |   Calc-Type   |    Priority   |
+-+-+-+-+-+-+-+-+-+-+-+-+-+-+-+-+-+-+-+-+-+-+-+-+-+-+-+-+-+-+-+-+
|                            Sub-TLVs                           |
+                                                               +
|                              ...                              |
|                                                               |
+-+-+-+-+-+-+-+-+-+-+-+-+-+-+-+-+-+-+-+-+-+-+-+-+-+-+-+-+-+-+-+-+
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |Flex-Algorithm |  Metric-Type  |
+-+-+-+-+-+-+-+-+-+-+-+-+-+-+-+-+-+-+-+-+-+-+-+-+-+-+-+-+-+-+-+-+
|   Calc-Type   |    Priority   |
+-+-+-+-+-+-+-+-+-+-+-+-+-+-+-+-+-+-+-+-+-+-+-+-+-+-+-+-+-+-+-+-+
|                            Sub-TLVs                           |
+                                                               +
|                              ...                              |
|                                                               |
+-+-+-+-+-+-+-+-+-+-+-+-+-+-+-+-+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |  auto-mesh    |
+-+-+-+-+-+-+-+-+-+-+-+-+-+-+-+-+-+-+-+-+-+-+-+-+-+-+-+-+-+-+-+-+
```

(1 byte) Type      = 8 {Auto-mesh capable}
(1 byte) Length    = 1
(1 byte) auto-mesh = 0 – 1 (Enable/ disable)

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type          | Length        | Flags         |   Algorithm   |
+-+-+-+-+-+-+-+-+-+-+-+-+-+-+-+-+-+-+-+-+-+-+-+-+-+-+-+-+-+-+-+-+
|                     SID/Index/Label (variable)                |
+-+-+-+-+-+-+-+-+-+-+-+-+-+-+-+-+-+-+-+-+-+-+-+-+-+-+-+-+-+-+-+-+
```

```
         0 1 2 3 4 5 6 7
        +-+-+-+-+-+-+-+-+
Flags   |R|N|P|E|V|L|AD| |
        +-+-+-+-+-+-+-+-+
```

FIG. 5

ZERO TOUCH CONFIGURATION FOR A MESH OF NODES USING SEGMENT ROUTING FLEXIBLE ALGORITHM

FIELD OF THE DISCLOSURE

The present disclosure relates generally to networking and computing. More particularly, the present disclosure relates to systems and methods for zero touch configuration for a mesh of nodes using Segment Routing Flexible Algorithm.

BACKGROUND OF THE DISCLOSURE

Segment Routing (SR) is a technology that implements a source routing paradigm. A packet header includes a stack of function identifiers, known as segments, which define an ordered list of functions to be applied to the packet. A segment can represent any instruction, topological, or service-based, and each Segment is represented by a Segment Identifier (SID). A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. In Segment Routing, a path includes segments which are instructions a node executes on an incoming packet.

SR Flexible Algorithm (also referred to as Flex Algorithm and Flex Algo, each of these terms is equivalent) is described in RFC 9350, "IGP Flexible Algorithm," February 2023, and RFC 9351, "Border Gateway Protocol-Link State (BGP-LS) Extensions for Flexible Algorithm Advertisement," February 2023, the contents of each are incorporated by reference in their entirety. The objective of Flex Algo is to create a new plane in the network. Flex Algo is called so because it allows a user the flexibility to define: (1) the type of calculation to be used (e.g., shortest path), (2) the metric type to be used (e.g., Interior Gateway Protocol (IGP) metric, Traffic Engineering (TE) metric, delay, etc.), and/or (3) the set of constraints to be used (e.g., inclusion or exclusion of certain links using affinities).

BRIEF SUMMARY OF THE DISCLOSURE

The present disclosure relates to systems and methods for zero touch configuration for a mesh of nodes using Segment Routing (SR) Flexible Algorithm (Flex Algo). In networks, such as metro networks, there can be a need to provide a service from any node to any node, without creating transport. A configuration feature referred to as "auto-mesh" that includes various configuration steps to automatically create transport and tunnel connectivity between a group of nodes, namely auto-mesh means to automatically create connectivity between the group of nodes as a full mesh meaning every node is connected to every other node with a tunnel. While the auto-mesh feature can set up connectivity between the group of nodes, it requires significant configuration such as choosing destination nodes. In large network, auto-mesh does not scale well and is burdensome on network operators for extensive selection and configuration of destination nodes.

Accordingly, the present disclosure utilizes SR and Flex Algo to create a specific auto-mesh plane which will contain nodes for services in an auto-mesh network. This addresses the scalability challenge with zero touch config by defining a Flex Algo Definition (FAD) creating an auto-mesh plane, and any node can participate therein. Specifically, the present disclosure includes a new FAD definition for 'auto-mesh-capability' that is shared using a new sub-Type-Length-Value (TLV). Also, the present disclosure extends the Flag bit in a Prefix SID TLV to indicate a given node is a destination node, i.e., destination nodes are ones that are auto-meshed, i.e., there is auto transport services created between them. Once this information is advertised, each node creates an auto-mesh destination register per Flex Algo which can be utilized by protocol manager within a node or Software Defined Networking (SDN) and other North bound interfaces to auto configure transport and services between destination nodes.

In various embodiments, the present disclosure includes a method having steps, an apparatus with one or more processors configured to implement the steps, and a non-transitory computer-readable medium storing instructions that, when executed, cause one or more processors to implement the steps. The steps relate to actions associated with a Segment Routing network that utilizes Flexible Algorithm. The steps include, responsive to a Flex Algo Definition (FAD) of an auto-mesh plane, providing an advertisement of a Prefix Segment Identifier (SID) for a node in the auto-mesh plane; and including a flag in the advertisement designating whether the node is a destination node or a non-destination node in the auto-mesh plane.

The destination node can be one which requires transport connectivity to all other destination nodes in the auto-mesh plane, and the non-destination node can be one used for reachability to all the destination nodes. The steps can further include when the node is a destination node in the auto-mesh plane, automatically creating transport or triggering creation of the transport to all other destination nodes in the auto-mesh plane. The transport can include encapsulated tunnels to all the other destination nodes. The steps can further include receiving advertisements from other nodes in the networks, the advertisements from the other nodes designate the other nodes are in the auto-mesh plane and whether the other nodes are each a destination node or a non-destination node.

The steps can further include utilizing the advertisements from the other nodes to automatically create transport or triggering creation of the transport to all other destination nodes in the auto-mesh plane. The steps can further include receiving the FAD of the auto-mesh plane based on a FAD Type-Length-Value (TLV) for one of Open Shortest Path First (OSPF) and Intermediate System-Intermediate System (ISIS). The FAD TLV can include a sub-sub TLV that determines the FAD is auto-mesh capable. The advertisement can be a Prefix-SID sub-TLV.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a diagram of a standard FAD TLV for Open Shortest Path First (OSPF), with type 16, from RFC 9350, Section 5.2.

FIG. 3 is a diagram of a standard FAD TLV for Intermediate System-Intermediate System (ISIS), with type 26, from RFC 9350, Section 5.1.

FIG. 4 is a new sub-sub TLV 'auto-mesh capable' that is used with the FAD TLVs in FIGS. 2 and 3.

FIG. 5 is a diagram of a Prefix-SID sub-TLV with a Flag byte.

DETAILED DESCRIPTION OF THE DISCLOSURE

Figure 1:
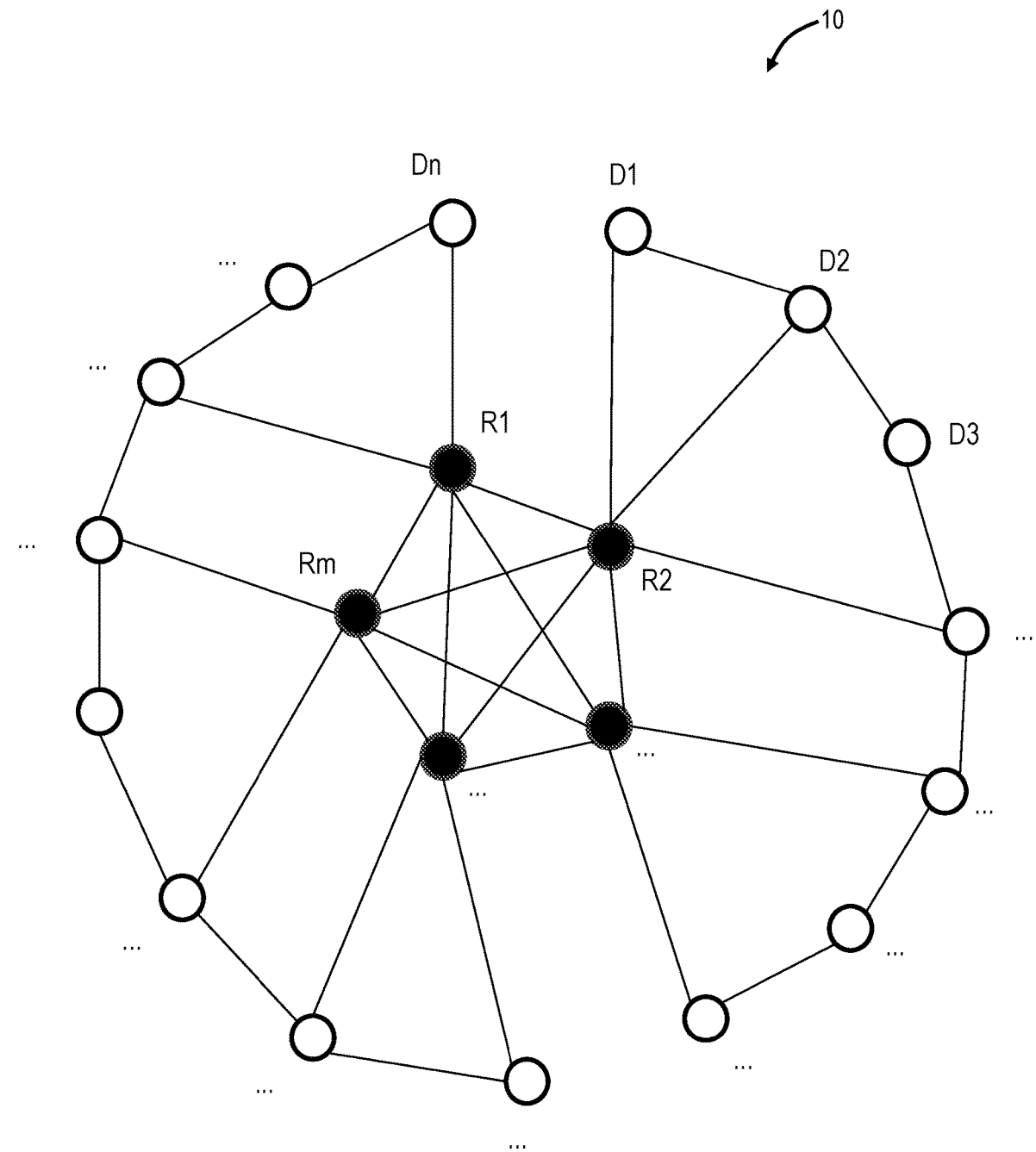
FIG. 1 is a network diagram of a Segment Routing network.

Again, the present disclosure relates to systems and methods for zero touch configuration for a mesh of nodes using Segment Routing (SR) Flexible Algorithm (Flex Algo). Advantageously, the present disclosure utilizes Flex Algo to create an auto-mesh plane, leading to a zero-touch configuration of auto-mesh, namely any node participating in the auto-mesh plane with a designation (Flag) that it is a destination node is automatically meshed with every other destination node.

Segment Routing Overview

A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietf.org/html/draft-previdi-6man-segment-routing-header-08) and RFC 8754, "IPv6 Segment Routing Header (SRH)," March 2020, the contents of both are incorporated by reference. A segment is encoded as an IPV6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path or is provided a path by a Software Defined Networking (SDN) controller or Path Computation Element (PCE) and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPV6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by Open Shortest Path First (OSPF) or Intermediate System-Intermediate System (ISIS). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a PCE (e.g., when paths span across multiple IGP areas/levels).

Flex-Algo Definition

Flex Algo is defined based on advertisements from routers using IGP (RFC 9350) and/or BGP (RFC 9351). IGP can include ISIS, OSPFv2, OSPFv3, etc. The following describes the definitions from RFC 9350, using IGP. RFC 9350 specifies a set of extensions to ISIS, OSPFv2, and OSPFv3 that enable a router to advertise TLVs that (a) identify a calculation-type, (b) specify a metric-type, and (c) describe a set of constraints on the topology that are to be used to compute the best paths along the constrained topology. A given combination of calculation-type, metric-type, and constraints is known as a "Flexible Algorithm Definition" or FAD. A router that sends such a set of TLVs also assigns a Flex-Algorithm value to the specified combination of calculation-type, metric-type, and constraints. RFC 9350 also specifies a way for a router to use IGPs to associate one or more (i) Segment Routing with the MPLS Data Plane (SR-MPLS) Prefix-SIDs [RFC 8660, "Segment Routing with the MPLS Data Plane, December 2019, the contents of which are incorporated by reference in their entirety] or (ii) Segment Routing over IPv6 (SRv6) locators [RFC 8986, "Segment Routing over IPv6 (SRv6) Network Programming," February 2021, the contents of which are incorporated by reference in their entirety], with a particular Flex Algo. Each such Prefix-SID or SRv6 locator then represents a path that is computed according to the identified Flex Algo. In SRv6, it is the locator, not the SID, that holds the binding to the algorithm.

To guarantee loop-free forwarding for paths computed for a particular Flex Algo, all routers that (a) are configured to participate in a particular Flex Algo and (b) are in the same Flex Algo. Accordingly, the definition advertisement scope must agree on the definition of the Flex Algo.

Problem Statement

Again, in metro networks there is a need to provide service from any node to any node without explicitly creating transport. FIG. 1 is a network diagram of a network 10 including a plurality of nodes $D_1$-$D_n$, $R_1$-$R_m$, where n and m are integers, >1, and not necessarily the same value. Consider the network 10 is a large metro network. The nodes $D_1$-$D_n$, $R_1$-$R_m$ are routers, switches, network elements, network devices, etc. that support SR and SR Flex Algo. The nodes $D_1$-$D_n$ are shown with white circles and are destination nodes meaning they require service configured between each of them, i.e., auto-mesh. The $R_1$-$R_m$ are shown with black circles and are non-destination nodes that are used for extended reachability and protection for the destination nodes $D_1$-$D_n$, i.e., the nodes $R_1$-$R_m$ do not require service or to be auto-meshed, but they may be involved with the transport and the tunnels between the destination nodes $D_1$-$D_n$.

Conventionally, to configure a full mesh, where every destination node $D_1$-$D_n$ is connected to one another, there is a need to transport connectivity and encapsulation tunnels between each destination node $D_1$-$D_n$. For example, in SR, the transport connectivity can include one or more Segment Identifiers (SIDs). Again, the present disclosure relates to auto-mesh with zero touch using SR and SR Flex Algo. The encapsulation tunnels ("encap") can include Pseudowires (PW), Virtual Private Networks (VPNs), Resource Reservation Protocol-Traffic Engineering (RSVP-TE), or any other suitable tunnel technology.

Auto-mesh means there is configuration of the transport connectivity and encapsulation tunnels between each destination node $D_1$-$D_n$. In the present disclosure, we will combine the two aspects of transport connectivity and encapsulation tunnels between each destination node $D_1$-$D_n$ and simply refer to this as "transport" or "transport configuration."

If there are n destination nodes (n is an integer greater than 1), the total transport required is equal to $n*(n-1)/2$. So, for a small network, say with 10 destination nodes, the total transport required is 45 tunnels, and as network scale with more than this, including hundreds as well as thousands of destination nodes, the transport increases accordingly. Of note, metro networks, especially for 5G, will have a large number of destination nodes. There is a further challenge when there is not simply one group of destination nodes, but rather where there are multiple different groups of destination nodes where each group requires a full mesh therein.

Again, as noted above, the conventional approach to auto-mesh is configuration intense and burdensome. Another issue is that the conventional approach to auto-mesh may use a brute force approach to tunnel creation, thereby having far more tunnels than are actual necessary, consuming resources on the nodes, including both the destination nodes and the non-destination nodes.

Flex Algo Definition to Support Auto-Mesh

In various embodiments, the present disclosure utilizes one or more Flex Algo planes, and a subsequent definition that the one or more Flex Algo planes are auto-mesh capable (e.g., via a sub-sub-TLV type for FAD). Now, when there is a group of destination of nodes $D_1$-$D_n$, that shall be configured given auto-mesh group, the destination of nodes $D_1$-$D_n$, and the non-destination nodes $R_1$-$R_m$ join (participate) in the Flex Algo plane for the auto-mesh group. The non-destination nodes $R_1$-$R_m$ can participate in the Flex Algo plane as they may need to forward traffic, but they do not need to create transport connectivity. In some embodiments, the destination of nodes $D_1$-$D_n$ and the non-destination nodes $R_1$-$R_m$ can include all nodes in the network. In other embodiments, the non-destination nodes $R_1$-$R_m$ can only include necessary nodes in the network to achieve full mesh connectivity to the destination of nodes $D_1$-$D_n$.

For the destination of nodes $D_1$-$D_n$, we include an additional flag to designate whether a node is a destination node or non-destination node. Accordingly, auto-mesh can be automatically (zero touch) configured in the Flex Algo plane based on the nodes being participants and with tunnel connectivity based on each node's advertisement of whether it is a destination node or non-destination node.

FIG. 2 is a diagram of a standard FAD TLV for OSPF, with type 16, from RFC 9350, Section 5.2. FIG. 3 is a diagram of a standard FAD TLV for ISIS, with type 26, from RFC 9350, Section 5.1. These FAD TLVs are shared across the network, as defined in RFC 9350, so that all routers (i.e., destination nodes and non-destination nodes) that (a) are configured to participate in a particular Flex Algo and (b) are in the same Flex Algo Definition advertisement scope MUST agree on the definition of the Flex Algo. FIG. 4 is a new sub-sub TLV 'auto-mesh capable' that is used with the FAD TLVs in FIGS. 2 and 3.

To create a Flex Algo definition to support auto-mesh, the present disclosure includes configuring the FAD (FIG. 2 or 3) with 'auto-mesh capable' information (FIG. 4, sub-sub TLV 'auto-mesh capable') in the FAD sub TLV. In FIG. 4, the sub-sub TLV 'auto-mesh capable' is a Boolean value to indicate this algorithm supports auto-mesh capability. A non-presence of this sub-sub TLV indicates the auto-mesh capability is disabled. For IGP to be able to flood this information, the new sub-sub TLV 'auto-mesh capable' in FIG. 4 is provided need to be defined in the FAD. FIG. 4 is one example suggestion for the new sub-sub TLV 'auto-mesh capable,' other embodiments are also contemplated. For example, this type value of the sub-sub-TLV will be determined via a standardization process.

FIG. 5 is a diagram of a Prefix-SID sub-TLV with a Flag byte. The Prefix-SID sub-TLV is from RFC 8667, "IS-IS Extensions for Segment Routing," December 2019, the contents of which are incorporated by reference in their entirety. The Prefix-SID sub-TLV is used for node participation in FAD-All nodes define a prefix SID for the algorithm as required. The standard IGP Prefix SID sub TLV is shown in FIG. 5. The Flags byte can be extended by an additional flag bit to be set as an indication whether the node intends to be a destination node or a non-destination node. Destination nodes auto creates transports and services between them. For example, the AD flag bit-auto-mesh Destination flag, if set the node is destination node in the auto-mesh plane, otherwise, the node is a non-destination node. The bit can be formalized through standardization process to utilize one of the spare bits in the Flags byte.

Example Use Case—Single Auto-Mesh Plane

Figure 6:
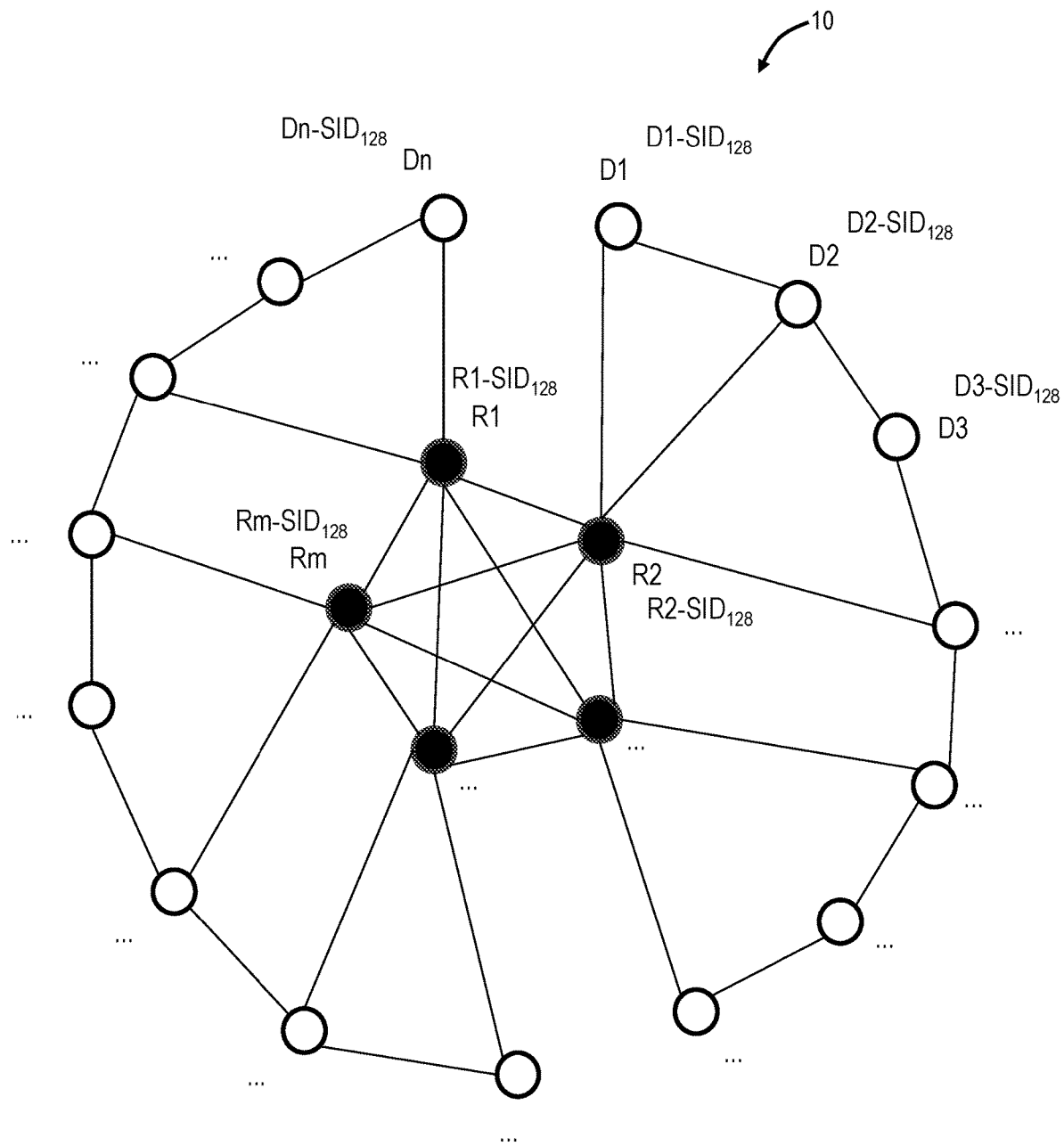
FIG. 6 is a network diagram of the network including a plurality of nodes $D_1$-$D_n$, $R_1$-$R_m$, for illustrating a single auto-mesh plane example.

FIG. 6 is a network diagram of the network 10 including a plurality of nodes $D_1$-$D_n$, $R_1$-$R_m$, for illustrating a single auto-mesh plane example. For example, FAD 128 is defined with auto-mesh capable Enabled. All destination nodes $D_1$ . . . $D_n$ nodes define prefix $SID_{128}$ and set the AD flag as set. All non-destination nodes $R_1$ . . . . $R_m$ nodes define prefix $SID_{128}$ and keep the AD flag as unset. The Flex Algo auto-mesh infrastructure helps define the auto-mesh destination registry at each node which shall be used by protocol managers or northbound apps to auto create transport and services.

Example Use Case—Multiple Distinct Auto-Mesh Planes

Figure 7:
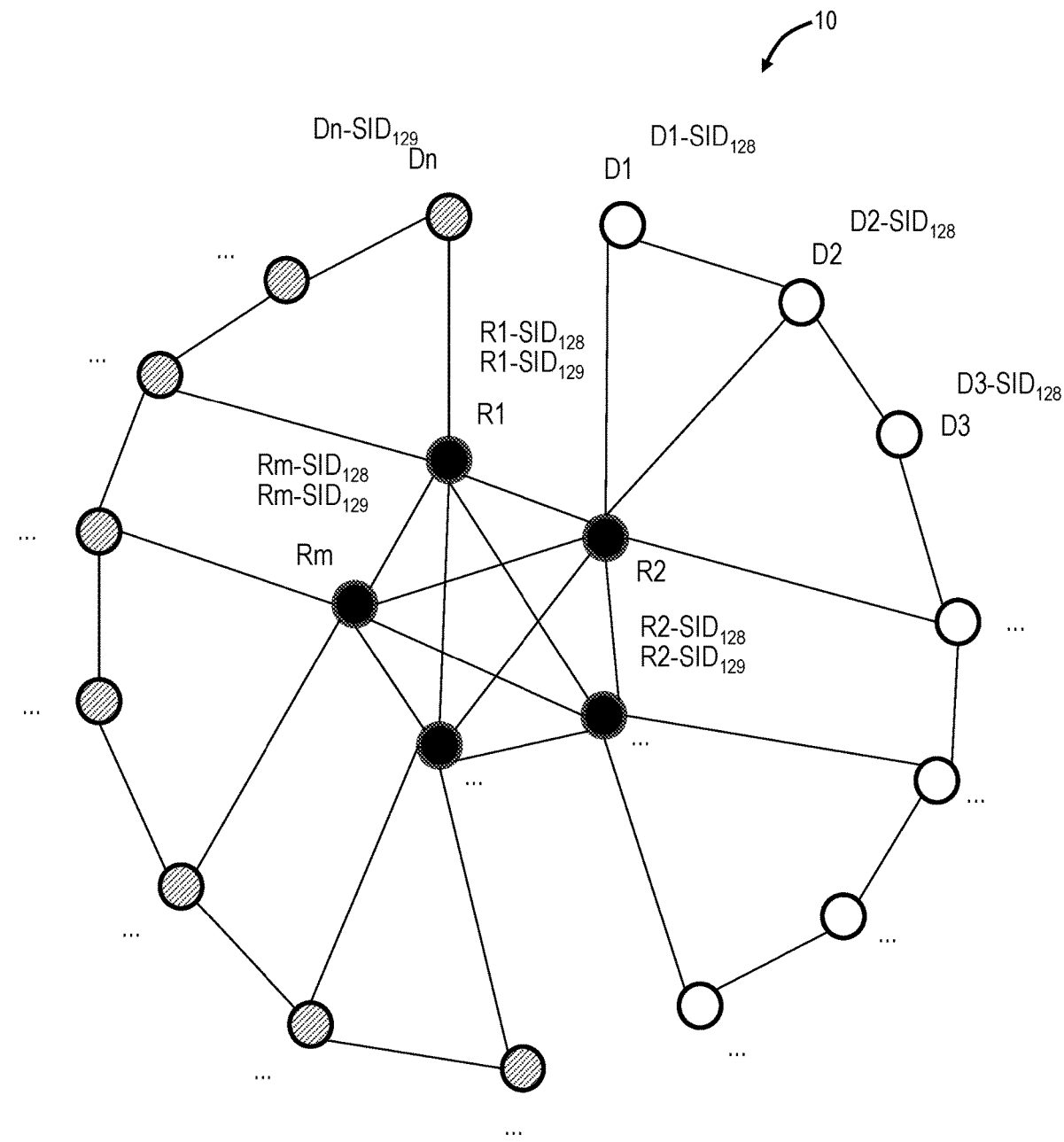
FIG. 7 is a network diagram of the network including a plurality of nodes $D_1$-$D_n$, $R_1$-$R_m$, for illustrating a multiple distinct auto-mesh planes example.

FIG. 7 is a network diagram of the network 10 including a plurality of nodes $D_1$-$D_n$, $R_1$-$R_m$, for illustrating a multiple distinct auto-mesh planes example. This example includes two auto-mesh planes, one have destination nodes in white circles and one having destination nodes with diagonal hatch lines. FAD 128 is defined with auto-mesh capable enabled (white circles), and FAD 129 is defined with auto-mesh capable enabled (circles with diagonal hatch lines). For the first group, all destination nodes (white circles) define prefix $SID_{128}$ and set the AD flag as set, and for the second group, all destination nodes (circles with diagonal hatch lines) define prefix $SID_{129}$ and set the AD flag as set. All non-destination nodes $R_1$ . . . . $R_m$ nodes define both prefix $SID_{128}$ and $SID_{129}$ keep the AD flag as unset. The auto-mesh destination registry created at each node will aid in creating auto transports and services between all destination nodes respectively.

Example Use Case—Multiple Distinct Auto-Mesh Planes with Nodes in Both

Figure 8:
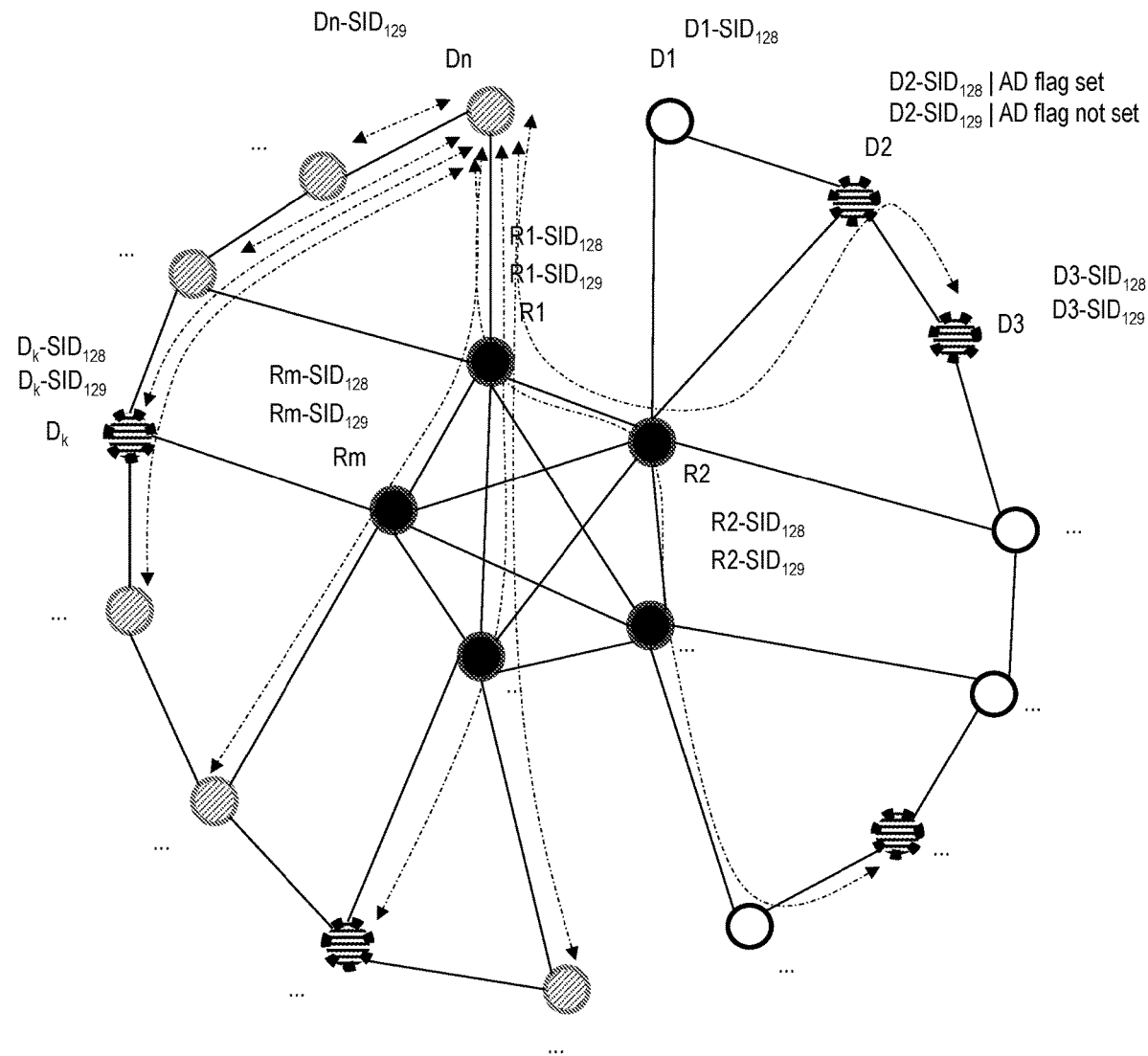
FIG. 8 is a network diagram of the network 10 including a plurality of nodes $D_1$-$D_n$, $R_1$-$R_m$, for illustrating a multiple distinct auto-mesh planes example with some nodes in both planes.

FIG. 8 is a network diagram of the network 10 including a plurality of nodes $D_1$-$D_n$, $R_1$-$R_m$, for illustrating a multiple distinct auto-mesh planes example with some nodes in both planes. FIG. 8 uses the same FADs 128, 129 from FIG. 7, and adds destination nodes (horizontal hatch lines and dotted circumference) which are part of both the groups (FAS 128, 129). These nodes are part of both Group 1 and 2 and define both SID 128 and $SID_{129}$ and set AD flag set in both prefix SID TLV. Node D2 does not set AD flag for the plane algo 129 (non-destination), to facilitate transit to D3 for green plane algo 128. All non-destination nodes $R_1$ . . . . $R_m$ nodes define both prefix $SID_{128}$ and $SID_{129}$ keep the AD flag as unset.

Node Configuration

Figure 9:
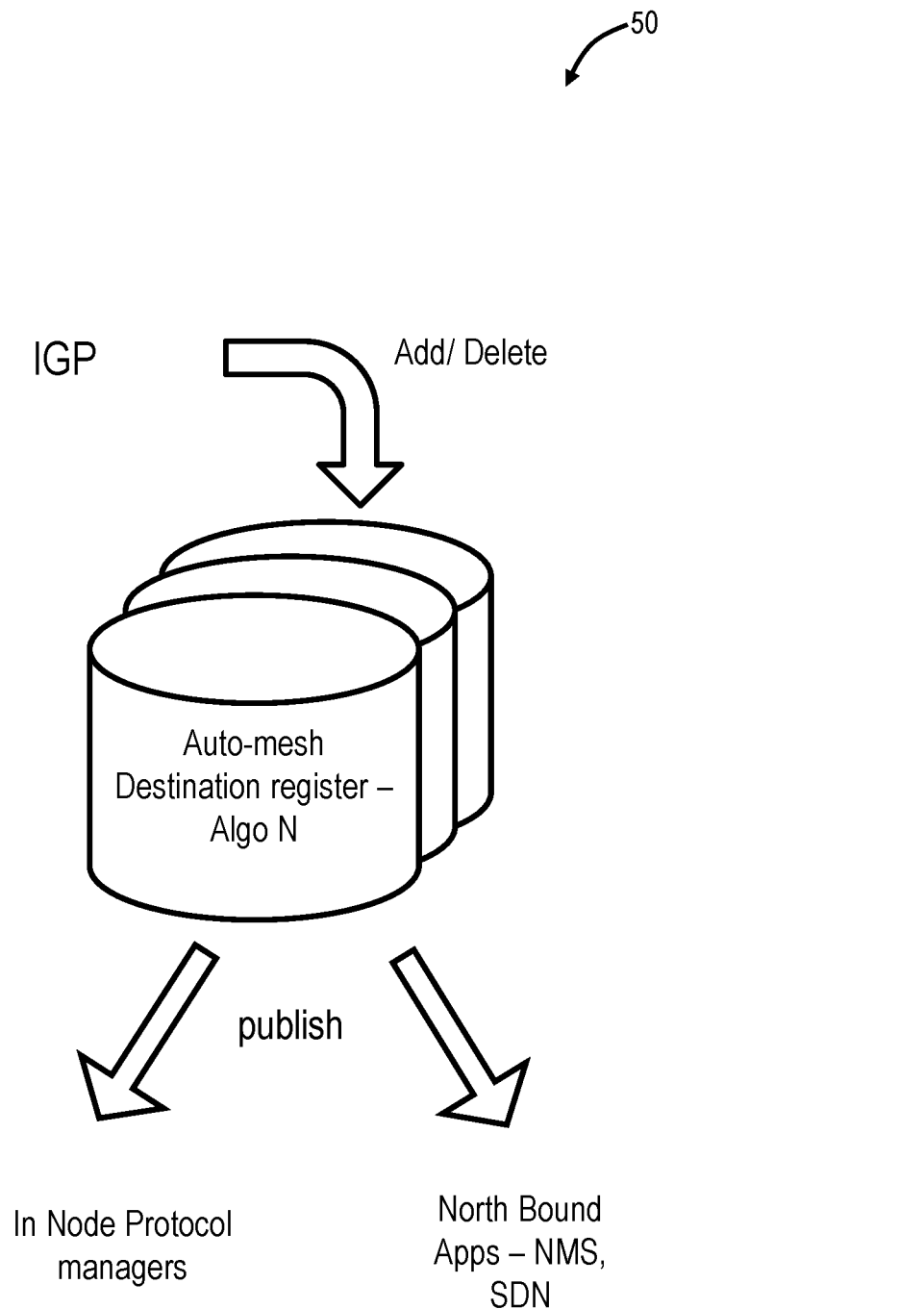
FIG. 9 is a diagram of functionality at one of the nodes in the network 10 for participating in the Flex Algo auto-mesh capable.

FIG. 9 is a diagram of functionality at one of the nodes in the network 10 for participating in the Flex Algo auto-mesh capable. FAD k is defined with 'Auto mesh capable' as Enabled, where k is the Flex Algo auto-mesh plane. All participating nodes define a prefix SID for FAD k in the Flex Algo auto-mesh plane. All or many nodes set 'AD' flag to announce they are destination nodes. IGP advertises the FAD and prefix SID-k across network with the AD flag. Each node creates a topology-k Dijkstra tree for path computation for all nodes participating in the auto-mesh plane. (Regular Flex Algo function). [New with Auto-mesh capable] IGP creates an auto-mesh destination register for each Flex Algo k which is auto-mesh capable at each node. The register includes a list of all nodes participating in FAD and with AD flag set. Applications that subscribe to the auto-mesh destination register shall receive the destination database. The application could be within the node typical protocol managers such as Segment Routing Policy Manager or a Transport Policy Manager which will auto create transports between each destination pair. The application could be northbound such as a Network Management System (NMS), SDN, etc. which would auto create transport and services between each destination pairs.

Extended Protection Process—Definition

Figure 10:
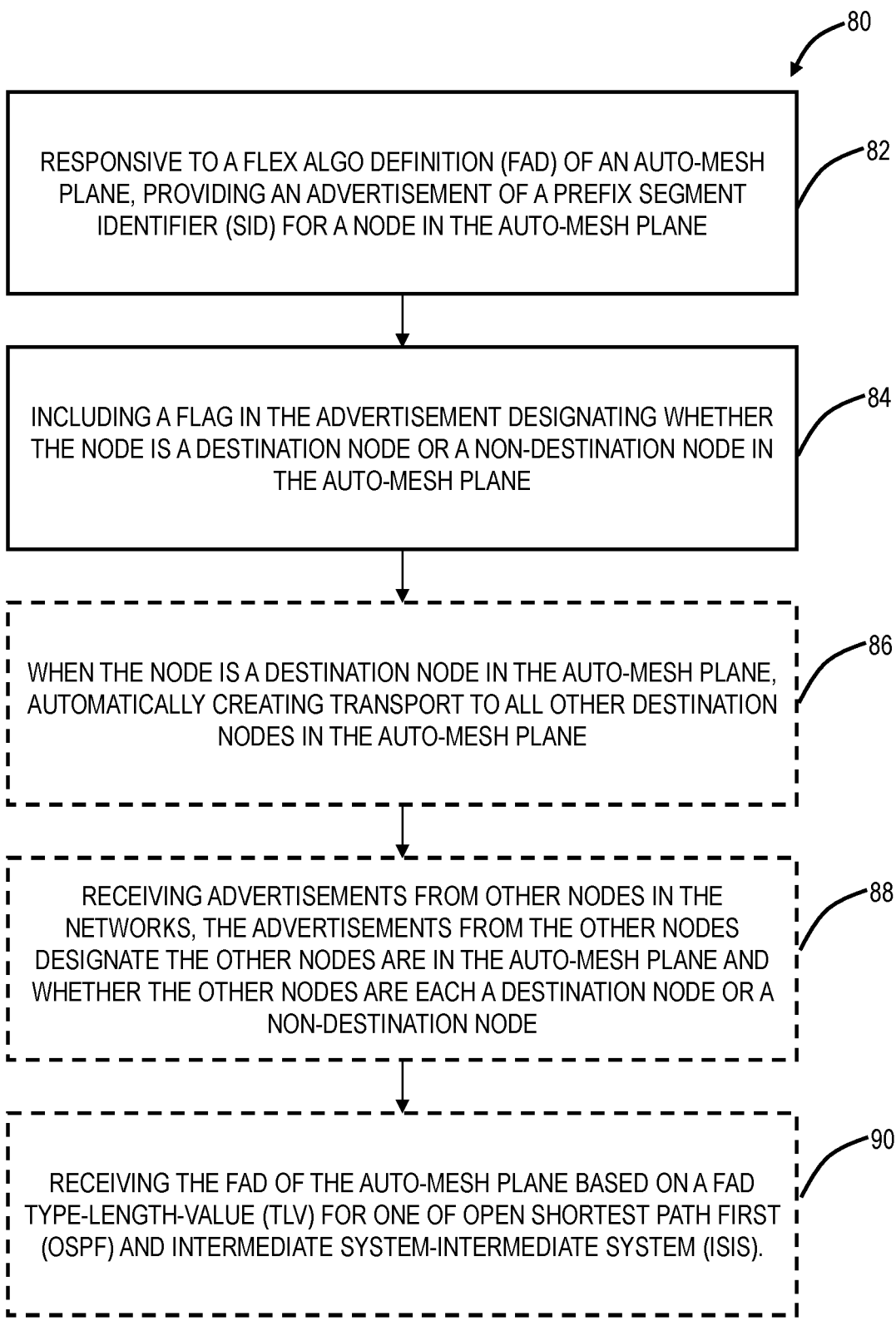
FIG. 10 is a flowchart of a process for zero touch configuration of a mesh of nodes using Segment Routing (SR) Flexible Algorithm (Flex Algo).

FIG. 10 is a flowchart of a process 80 for zero touch configuration of a mesh of nodes using Segment Routing (SR) Flexible Algorithm (Flex Algo). The process 80 contemplates implementation as a method having steps, via a processing device (e.g., the controller in FIG. 12) configured to implement the steps, via one of the nodes (e.g., the router in FIG. 11) configured to implement the steps, and via a non-transitory computer-readable medium storing instructions that, when executed, cause one or more processors to implement the steps.

The process 80 includes, responsive to a Flex Algo Definition (FAD) of an auto-mesh plane, providing an advertisement of a Prefix Segment Identifier (SID) for a node in the auto-mesh plane (step 82); and including a flag in the advertisement designating whether the node is a destination node or a non-destination node in the auto-mesh plane (step 84). The destination node is one which requires transport connectivity to all other destination nodes in the auto-mesh plane, and the non-destination node is one used for reachability to all the destination nodes.

The process 80 further includes, when the node is a destination node in the auto-mesh plane, automatically creating transport or triggering creation of the transport to all other destination nodes in the auto-mesh plane (step 86). If the process 80 is performed by a centralized node (e.g., NMS, PCE), then it will 'trigger' (i.e., it will not 'automatically create') creation of transport from the 'destination node' to all other destination nodes. Alternatively, if the process 80 is performed by a destination node (e.g., a node in the segment routing network), then it will 'automatically create transport from the 'destination node' (i.e., itself) to all other destination nodes.

The transport can include encapsulated tunnels to all the other destination nodes. The process 80 further includes receiving advertisements from other nodes in the networks, the advertisements from the other nodes designate the other nodes are in the auto-mesh plane and whether the other nodes are each a destination node or a non-destination node (step 88). The process 80 further includes utilizing the advertisements from the other nodes to automatically create transport to all other destination nodes in the auto-mesh plane.

The process 80 further includes receiving the FAD of the auto-mesh plane based on a FAD Type-Length-Value (TLV) for one of Open Shortest Path First (OSPF) and Intermediate System-Intermediate System (ISIS) (step 90). The FAD TLV can include a sub-sub TLV that determines the FAD is auto-mesh capable. The advertisement can be a Prefix-SID sub-TLV.

Example Node

Figure 11:
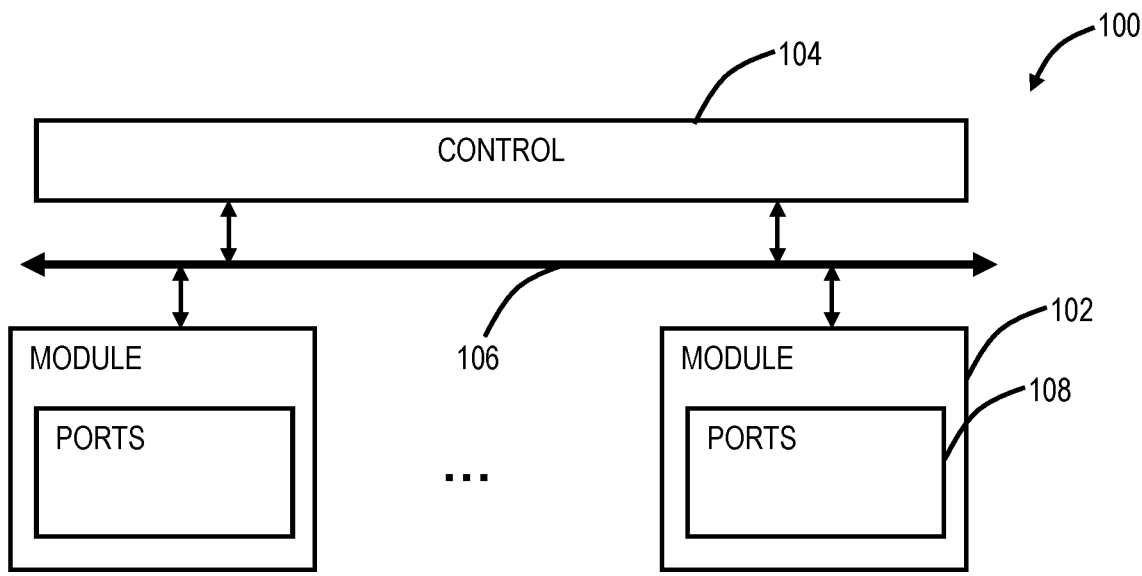
FIG. 11 is a block diagram of an example implementation of a router, such as forming any of the nodes described herein.

FIG. 11 is a block diagram of an example implementation of a router 100, such as forming any of the nodes described herein. Those of ordinary skill in the art will recognize FIG. 11 is a functional diagram in an oversimplified manner, and a practical embodiment may include additional components and suitably configured processing logic to support known or conventional operating features that are not described in detail herein.

In an embodiment, the router 100 can be any network element or other implementations that support Segment Routing and Flex Algo. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, a PCE, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 10 is meant to provide a functional view, and those of ordinary skill in the art will recognize actual hardware implementations may vary; all of which are contemplated herewith.

Example Controller

Figure 12:
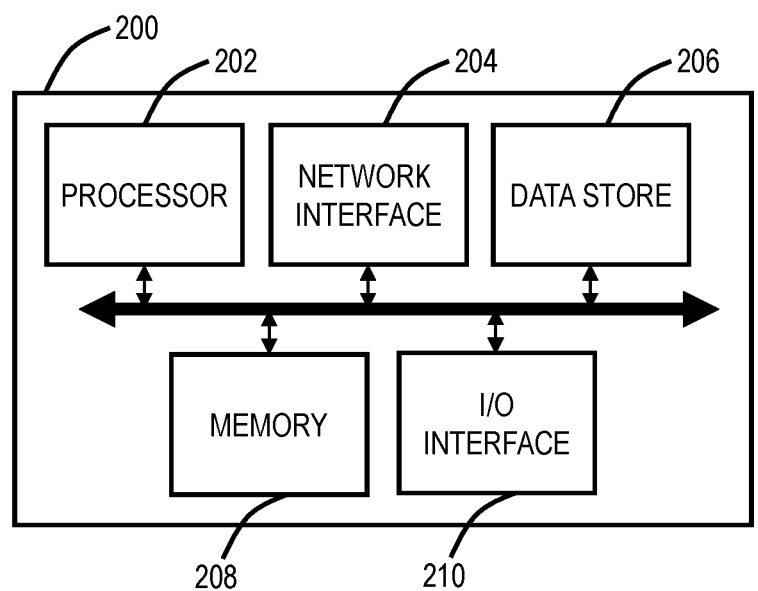
FIG. 12 is a block diagram of an example processing device.

FIG. 12 is a block diagram of an example processing device 200. The processing device 200 can be part of the router 100, or a stand-alone device communicatively coupled to the router 100, such as a PCE. Also, the processing device 200 can be referred to in implementations as a control module, a shelf controller, a shelf processor, a system controller, etc. The processing device 200 can be configured to perform the various functions described herein, including computing protection, managing the Flex Algo definitions, and utilizing the extended protection based on the Flex Algo definitions. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A non-transitory computer-readable medium comprising instructions that, when executed, cause one or more processors to implement steps, for a Segment Routing network that utilizes Flexible Algorithm, wherein the steps include:

responsive to a Flex Algo Definition (FAD) of an auto-mesh plane, providing an advertisement of a Prefix Segment Identifier (SID) for a node in the auto-mesh plane;

including a flag in the advertisement designating whether the node is a destination node or a non-destination node in the auto-mesh plane; and checking the flag in a received advertisement associated with another node, and, when the node is a destination node which requires transport connectivity based on the flag in the received advertisement, automatically creating transport or triggering the transport to the another node in the auto-mesh plane, wherein the transport includes an encapsulated tunnel between the node and the another node.

2. The non-transitory computer-readable medium of claim 1, wherein the destination node is one which requires transport connectivity to all other destination nodes in the auto-mesh plane, and the non-destination node is one used for reachability to all the destination nodes.

3. The non-transitory computer-readable medium of claim 1, wherein the steps include receiving advertisements from other nodes in the networks, the advertisements from the other nodes designate the other nodes are in the auto-mesh plane and whether the other nodes are each a destination node or a non-destination node, wherein the non-destination node is one used for reachability to the destination nodes.

4. The non-transitory computer-readable medium of claim 1, wherein the steps include receiving the FAD of the auto-mesh plane based on a FAD Type-Length-Value (TLV) for one of Open Shortest Path First (OSPF) and Intermediate System-Intermediate System (ISIS).

5. The non-transitory computer-readable medium of claim 4, wherein the FAD TLV includes a sub-sub TLV that determines the FAD is auto-mesh capable.

6. The non-transitory computer-readable medium of claim 1, wherein the advertisement is a Prefix-SID sub-TLV.

7. An apparatus comprising:

one or more processors; and memory storing instructions that, when executed, cause the one or processors to:
responsive to a Flex Algo Definition (FAD) of an auto-mesh plane, provide an advertisement of a Prefix Segment Identifier (SID) for a node in the auto-mesh plane,
including a flag in the advertisement designating whether the node is a destination node or a non-destination node in the auto-mesh plane, and
check the flag in a received advertisement associated with another node, and, when the node is a destination node which requires transport connectivity based on the flag in the received advertisement, automatically create transport or trigger the transport to the another node in the auto-mesh plane, wherein the transport includes an encapsulated tunnel between the node and the another node the node.

8. The apparatus of claim 7, wherein the destination node is one which requires transport connectivity to all other destination nodes in the auto-mesh plane, and the non-destination node is one used for reachability to all the destination nodes.

9. The apparatus of claim 8, wherein the instructions that, when executed, further cause the one or processors to
receive advertisements from other nodes in the networks, the advertisements from the other nodes designate the other nodes are in the auto-mesh plane and whether the other nodes are each a destination node or a non-destination node.

10. The apparatus of claim 8, wherein the steps include receiving the FAD of the auto-mesh plane based on a FAD Type-Length-Value (TLV) for one of Open Shortest Path First (OSPF) and Intermediate System-Intermediate System (ISIS).

11. The apparatus of claim 10, wherein the FAD TLV includes a sub-sub TLV that determines the FAD is auto-mesh capable.

12. A method associated with a Segment Routing network that utilizes Flexible Algorithm, the method comprising steps of:
responsive to a Flex Algo Definition (FAD) of an auto-mesh plane, providing an advertisement of a Prefix Segment Identifier (SID) for a node in the auto-mesh plane;
including a flag in the advertisement designating whether the node is a destination node or a non-destination node in the auto-mesh plane; and
checking the flag in a received advertisement associated with another node, and, when the node is a destination node which requires transport connectivity based on the flag in the received advertisement, automatically creating transport or triggering the transport to the another node in the auto-mesh plane, wherein the transport includes an encapsulated tunnel between the node and the another node.

13. The method of claim 12, wherein the destination node is one which requires transport connectivity to all other destination nodes in the auto-mesh plane, and the non-destination node is one used for reachability to all the destination nodes.

14. The method of claim 12, wherein the steps include
receiving advertisements from other nodes in the networks, the advertisements from the other nodes designate the other nodes are in the auto-mesh plane and whether the other nodes are each a destination node or a non-destination node.

15. The method of claim 12, wherein the steps include
receiving the FAD of the auto-mesh plane based on a FAD Type-Length-Value (TLV) for one of Open Shortest Path First (OSPF) and Intermediate System-Intermediate System (ISIS).

* * * * *